Figure 6:
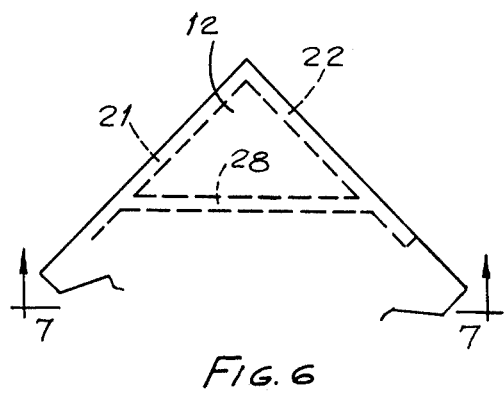

United States Patent [19]
Michelotti

[11] 4,119,045
[45] Oct. 10, 1978

[54] KNOCK-DOWN SHELVING STRUCTURE

[76] Inventor: Victor Galileo Michelotti, 6910 City Line Ave., Philadelphia, Pa. 19151

[21] Appl. No.: 823,829

[22] Filed: Aug. 11, 1977

[51] Int. Cl.² ............................................. A47B 47/00
[52] U.S. Cl. ................................... 108/156; 211/186; 108/111
[58] Field of Search .............. 108/156, 111, 101, 109, 108/152; 211/186; 5/294

[56] References Cited
U.S. PATENT DOCUMENTS

| 1,109,765 | 9/1914 | Lampert | 108/111 |
|---|---|---|---|
| 1,386,168 | 8/1921 | Erickson | 108/109 |
| 1,545,165 | 7/1925 | O'Connor | 108/111 |
| 2,110,034 | 3/1938 | Bales | 108/156 |
| 2,150,795 | 3/1939 | Beckwith | 108/152 |
| 2,677,470 | 5/1954 | Catalano | 211/186 X |
| 2,702,127 | 2/1955 | Pastorius | 211/186 X |
| 3,269,338 | 8/1966 | Shewell | 108/109 X |

FOREIGN PATENT DOCUMENTS 220,772  3/1959  Australia .................................. 108/156

Primary Examiner—Francis K. Zugel

[57] ABSTRACT

A knock-down shelving structure has corner posts with upstanding studs on their inner sides, the studs being triangular in cross section and presenting two of their faces parallel to the inner faces of the posts, and also has shelves with triangular sockets at their corners and on the under sides to snugly receive the studs.

1 Claim, 11 Drawing Figures

U.S. Patent  Oct. 10, 1978  Sheet 1 of 2  4,119,045
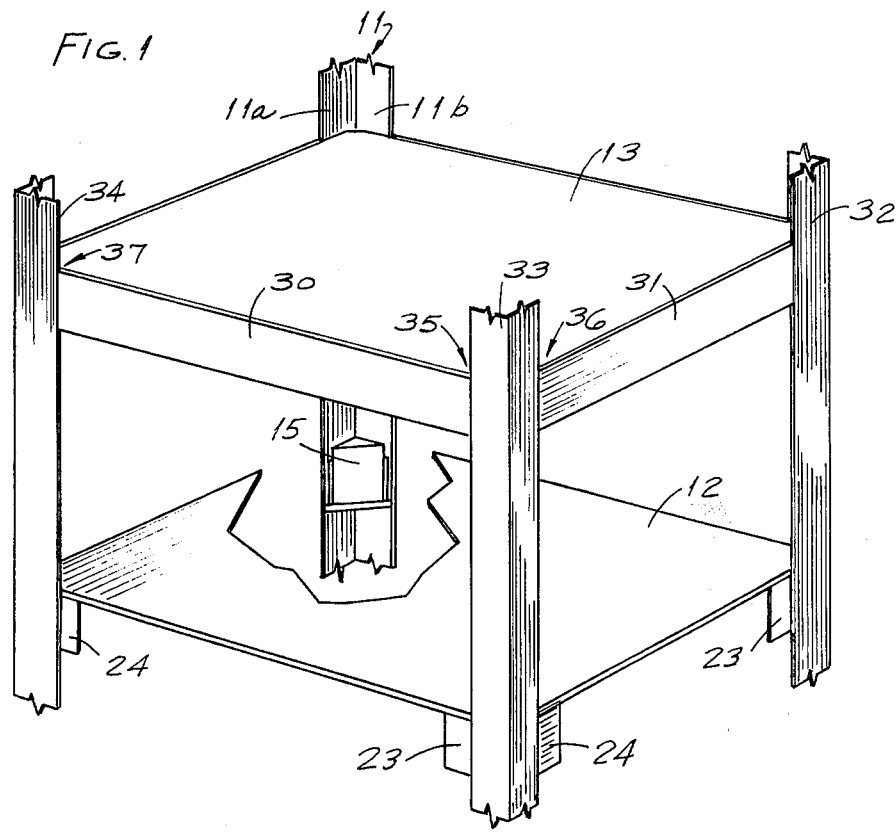
FIG. 1
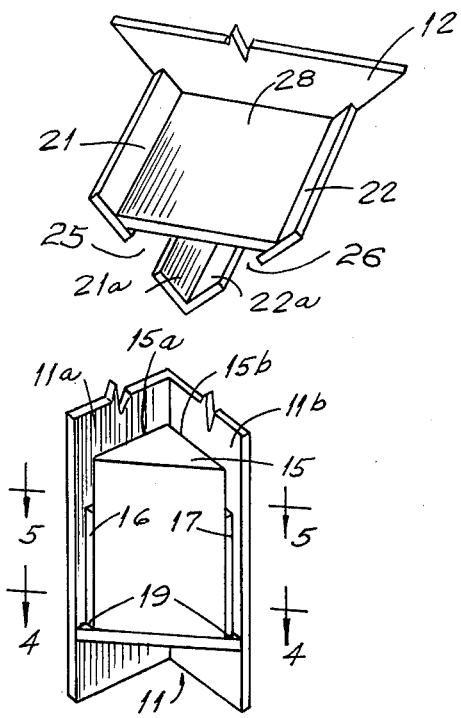
FIG. 2
FIG. 3
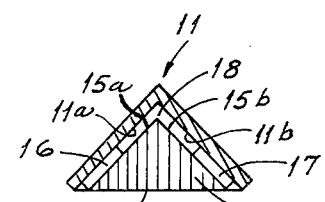
FIG. 5
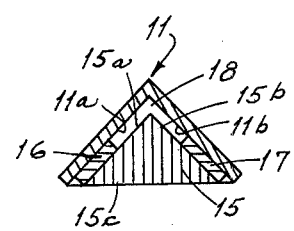
FIG. 4

KNOCK-DOWN SHELVING STRUCTURE

This invention relates to shelving structure and particularly to a so-called knock-down assembly which requires no bolts or like fasteners to hold it together.

The parts for a knock-down shelving structure would generally come in a kit form and usually it would include bolts and nuts which are to be used to attach the parts together and form the assembly. The parts are usually not permanently attached together as it is contemplated that the need may arise for dismantling the structure. Such disassembly of the completed structure should be accomplished with ease and without the breakage or injury of any parts. There may be a need for reassembling the knocked-down structure at another location and ordinarily the same bolts and nuts would be used.

If bolts and nuts or like fasteners are required in the assembly at least two persons may be required to line up and manually hold the parts in place and at the same time apply the fastening means. This same need for several persons would generally be required to remove the fasteners and hold the parts as they are separated from each other.

The shelving structure of the present invention does not require bolts and nuts or screws or like fastening means. The parts are structured so that they have interlocking, interengaging elements which fit together as the assembly is being made and which serve to releasibly retain the parts together as a completed shelving. These elements coact and cooperate with each other to form a frictional connection between the shelfs per se and the legs or corner posts per se.

As the frictional, interlocking interfit between the shelf and a corner post does not involve bolts and nuts or like fasteners, they may be separated by simply knocking them apart or giving them a sharp blow. Nothing is injured or broken in making such a disassembly and the parts may easily be reassembled.

A formost feature of the invention is that the interfit between the shelf and the corner post provides a rigid connection which resists or prevents the assembled shelving from swaying. The shelves maintain the corner posts in firmly upright positions and the corner posts hold the shelves against endwise or depthwise motion. An exceptionally stable assembly is formed without the need for bolts and nuts or like fasteners.

Figure 10:
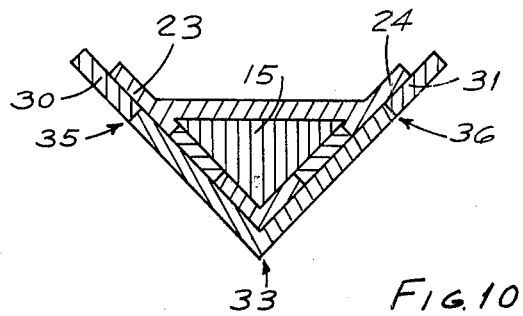
Figure 7:
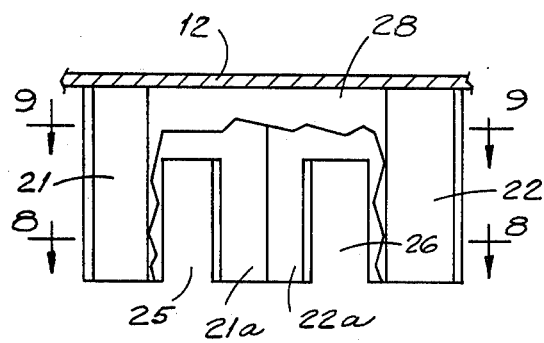
Figure 8A:
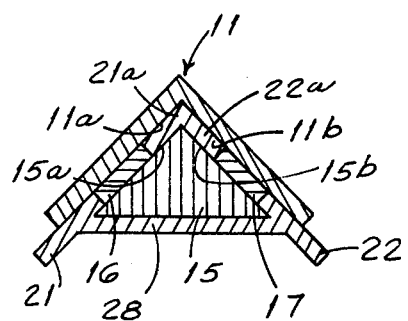
Figure 9:
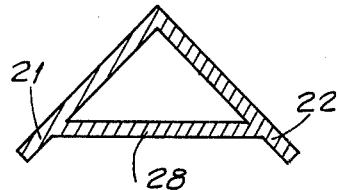
Figure 8:
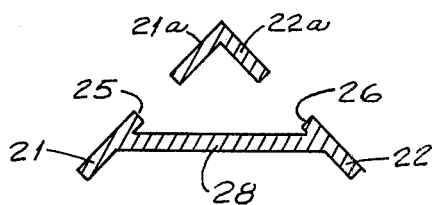

A preferred embodiment of the invention is shown in the accompanying drawings in which:

FIG. 1 is a perspective view looking toward and downwardly, on the assembly, a corner of a shelf being broken away, FIG. 2 is a perspective of the under side of the broken away portion of the shelf of FIG. 1 on a larger scale, FIG. 3 is a perspective of the far corner post and upright stud shown in FIG. 1 on a larger scale, FIG. 4 is a section on the line 4—4 of FIG. 3, FIG. 5 is a section on the line 5—5 of FIG. 3, FIG. 6 is a plan view of one of the shelf corners, such as looking down on the shelf corner of FIG. 2, FIG. 7 is a section on the line 7—7 of FIG. 6, a portion of the front cross plate being broken away, FIG. 8 is a section on the line 8—8 of FIG. 7, FIG. 8a is a section like FIG. 8 but with the corner post assembled in place, FIG. 9 is a section on the line 9—9 of FIG. 7, and FIG. 10 is a sectional view corresponding to FIG. 8a but it is of the top shelf assembly shown in the drawings.

There are four upright legs or corner posts 11, 32, 33 and 34. Each one is a right angle in cross section and if they are made of steel or iron they would be called "angle irons". Their height or length is immaterial to the practice of the invention and it is for this reason that their tops and bottoms are broken off in the drawing.

The leg 11 is shown as having the two inner faces 11a and 11b and this identification would apply to the other legs. Located on this inner side of the post 11 is an upright stud or stem 15 which is spaced from the faces 11a and 11b by the spacers or blocks 16 and 17. The stud has the face 15a which is spaced from but is parallel to the face 11a of the leg; also it has a face 15b which is spaced from and is parallel to the face 11b. The stud is shown as having the third face 15c which is a hypotenuse relative to the faces 15a and 15b so that the stud is a triangle in cross section. However, the face 15c can in fact be two or more sides but the triangular cross section is preferred.

The spacers 16 and 17 are not as high as the stud 15 so that the top of the stud is free around its entirety; in fact the spacers may need to be only half as high, more or less, as the height of the stud to provide the necessary firm attachment of the stud to the leg. Moreover, looking at FIGS. 4 and 5, the spacer 16 is not as wide as the entire width of the face 15a nor is the spacer 17 as wide as the entire width of face 15b. This leaves a space 18 which is a right angle in cross section between the lower end of the stud 15 and the inner faces of the corner post. This space 18 may be regarded as a pocket between the lower end of the stud 15 and the corner post as it receives a part of the shelf structure as will be explained.

The corner post 11 will have studs 15 positioned on it at places along its length where it is intended that shelves be located. The other legs will have their own studs located at corresponding places along their lengths, As the studs are strong and are rigidly attached to the corner posts they provide a firm base for supporting the shelves. To further resist twisting of the studs relative to the posts there may be provided webs or ribs 19 at the bottom of the stud. extending to the legs.

The corner post, spacers and studs are shown as separate pieces and if a metal is used they may be welded, riveted or bolted permanently together. If they are made of wood they may be glued, screwed or otherwise affixed together. It is preferred that the parts be made of a strong, rigid plastic and they may be fastened by glue or other means but it is preferred that the spacers be molded integrally with either the stud or the corner post to simplify manufacture. In fact, with modern plastic molding techniques it may be possible to shape in one integral piece the corner post and its spacers and studs, including the ribs 19 if they are to be provided.

The lower shelf 12 will first be described as the upper shelf 13 includes an additional, optional feature as will be explained. The shelves may be square or oblong and are preferably rectangular in shape. At each corner of shelf 12, at both side edges are the depending flanges 21 and 22 which form a right angle. For strength, each flange is preferably wider, but not necessarily, wider than the width of the corner post so that some of it is exposed beyond the post as is indicated at 23 and 24 for the post 33.

The flanges 21 and 22 have downwardly opening notches which are located inwardly from the corner.

Thus, flange 21 has the notch 25 therein located inwardly from the corner so that a short flange section 21a remains. A similar notch 26 is in the depending flange 22. Notches similar to 25 and 26 are in the other corner flanges corresponding to 21 and 22. The notches need to go up only high enough to fully receive the spacers 16 and 17 and the like spacers on the other corner posts when the shelves are put in place. The width of notch 25 corresponds to the width of the spacer 16 and this is true of the other notches and coacting spacers. Because of this the spacers have a snug fit in the notches and this contributes to the stability of the assembly as is apparent from FIG. 8a.

The flanges 21 and 22 are as thick as the width of the space between the surfaces 11a and 15a as is best shown in FIG. 8a so that a snug interfit is established. This further contributes to the stability or anti-sway properties of the assembly. It will be noted that the residual portions 21a and 22a left by the notches 25 and 26 form a depending tongue which is a right angle in cross section. This tongue fits down in the pocket 18 and bears on the coacting surfaces of the corner post and stud and further prevents any wobbling motion between the shelves and the legs.

A cross web or plate 28 is on the under side of the shelf 12 to provide a surface which bears against the surface 15c of the stud 15 and thereby form abutting surfaces to contribute additional strength to the assembly. This web or plate 28 may be integral with the shelf and flanges if a unitary, one-piece molded plastic is made for low-cost manufacture. However, the shelf, flanges and cross plates may be separate pieces of plastic, wood or metal which are glued, nailed, screwed, welded or otherwise suitably fastened together to form the corners like the one which is shown in FIG. 2.

The top of the stud 15, therefore, fits upwardly in a socket formed on the under side of the shelf 12 which is established by the cross plate 28 and the depending flanges 21 and 22 including their residual portions 21a and 22a. When the assembly is made by simply pushing the studs or prongs up in their receiving sockets a large number of cooperating surfaces fit flatwise against each other. The spacers 16 and 17 closely fit up in the notches 25 and 26. The angular tongue 21a–22a fits down in the angular pocket 18 so that an unusually stable assembly results without the need for bolts and nuts or like fasteners.

The shelf 13 is a duplicate of shelf 12 with the addition at its edges of the strips or bands 30 and 31, as shown in FIGS. 1 and 10. Similar bands are at the other two edges of FIG. 1, and these four bands form a continuous skirt around the edge of the shelf between the four corner posts. The band 30 is attached to or is formed integrally with the exposed flanges 23 and 24 which are a part of the upper shelf. The band 31 is attached to or is integral with like depending flanges 23 and 24 of shelf 13.

One end edge of band 30 abuts against the edge of the corner post 33 as indicated at 35 and the other end edge of band 30 abuts against the edge of corner post 34 as indicated at 37. A similar abutment exists at 36 for one end of band 31. These several abutments around the shelf 13 serve to increase the stability of the assembly. Additionally, the bands cover the depending flanges and improve the appearance of the shelf.

The outer surface of the bands may be flush with the outer surfaces of the corner posts. The bands may be fastened to or be molded integral with the shelf 13 itself to prevent sagging of the shelf. This sagging may also be minimized by elongating the flanges 21 and 22 along the entire respective edges. In effect, this would join the exposed flange 23 at post 33 with the exposed flange 24 at post 34 so that it is continuous between them and this would be carried out at the other sides.

I claim:

1. A shelving structure comprising upright, right-angular corner posts, each having at least one upstanding stud attached to its inner side at a level at which a shelf is to be supported, each stud being triangular in cross-section and presenting faces which are opposed to and are substantially parallel to the inner faces of the posts so that a space of uniform thickness exists between the two inner faces of the post and the opposing faces of the stud; and a shelf having depending flanges forming a triangular socket on the under side of the shelf to receive and fit the stud, said flanges including portions which snugly fit in said spaces between the stud and the corner post wherein the stud is attached to the corner post by spacers at the lower end of the stud and the spacers are of less width than the width of the stud faces so that a right-angular shaped pocket is formed between the lower end of the stud and the inner corner of the post and in which said flange portions include a tongue which is right-angular in cross-section and fits down in said pocket, and notches in said flange portions to receive said spacers.